United States Patent
Atanassov et al.

(10) Patent No.: US 10,771,768 B2
(45) Date of Patent: Sep. 8, 2020

(54) SYSTEMS AND METHODS FOR IMPROVED DEPTH SENSING

(71) Applicant: QUALCOMM Incorporated, San Diego, CA (US)

(72) Inventors: Kalin Atanassov, San Diego, CA (US); Sergiu Goma, San Diego, CA (US); Stephen Michael Verrall, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 185 days.

(21) Appl. No.: 15/380,745

(22) Filed: Dec. 15, 2016

(65) Prior Publication Data

US 2018/0176542 A1 Jun. 21, 2018

(51) Int. Cl.
*H04N 13/271* (2018.01)
*H04N 5/907* (2006.01)
(Continued)

(52) U.S. Cl.
CPC ........... *H04N 13/271* (2018.05); *G06T 7/521* (2017.01); *H04N 5/907* (2013.01); *H04N 13/254* (2018.05);
(Continued)

(58) Field of Classification Search
None
See application file for complete search history.

(56) References Cited

U.S. PATENT DOCUMENTS

| 2006/0013449 | A1 | 1/2006 | Marschner et al. |
| 2014/0049609 | A1 * | 2/2014 | Wilson .................... G01S 17/89 348/46 |

(Continued)

FOREIGN PATENT DOCUMENTS

WO WO-2017009848 A1 * 1/2017 ........... G01S 17/107

OTHER PUBLICATIONS

Supreeth Achar et al: "Multi Focus Structured Light.for Recovering Scene Shape and Global Illumination" In: Lecture Notes in Computer Science*, Jan. 1, 2014 (Jan. 1, 2014), vol. 8689, pp. 205-219.*
(Continued)

*Primary Examiner* — James M Anderson, II
(74) *Attorney, Agent, or Firm* — Paradice and Li LLP

(57) ABSTRACT

Methods and systems disclosed provide improved depth sensing for an imaging device. In some aspects, a plurality of transmitters including a first transmitter are configured to generate a structured light pattern with a first depth of field at a first resolution and a second structured light pattern with a second depth of field at the first resolution, wherein the second depth of field is wider than the first depth of field. A receiver, such as an imaging sensor, is configured to focus within the first depth of field to receive the first structured light pattern and capture a first image representing the first structured light pattern and to focus within the second depth of field to receive the second structured light pattern and capture a second image representing the second structured light pattern. An electronic hardware processor is configured to generate a depth map of the scene based on the first image and the second image.

15 Claims, 14 Drawing Sheets

(51) Int. Cl.
  *H04N 13/254* (2018.01)
  *H04N 13/296* (2018.01)
  *G06T 7/521* (2017.01)
(52) U.S. Cl.
  CPC . *H04N 13/296* (2018.05); *G06T 2207/10028* (2013.01)

(56) References Cited

U.S. PATENT DOCUMENTS

| | | |
|---|---|---|
| 2014/0267627 A1 | 9/2014 | Freeman et al. |
| 2014/0313519 A1 | 10/2014 | Shpunt et al. |
| 2015/0022697 A1* | 1/2015 | Appia .................... H04N 9/317 348/240.99 |
| 2015/0310620 A1 | 10/2015 | Aviv et al. |
| 2016/0109575 A1 | 4/2016 | Oggier et al. |
| 2016/0267671 A1 | 9/2016 | Atanassov et al. |
| 2016/0344910 A1* | 11/2016 | Shen .................... H04N 5/2256 |

OTHER PUBLICATIONS

Achar S., et al., "Multi Focus Structured Light for Recovering Scene Shape and Global Illumination" In: "Lecture Notes in Computer Science", Jan. 1, 2014 (Jan. 1, 2014), Springer Berlin Heidelberg, Berlin, Heidelberg, vol. 8689, XP055193120, pp. 205-219.
International Search Report and Written Opinion—PCT/US2017/058982—ISA/EPO—Feb. 1, 2018.

* cited by examiner

SYSTEMS AND METHODS FOR IMPROVED DEPTH SENSING

BACKGROUND

Field

This technology relates to active depth sensing, and more specifically, to generating a depth map of a scene to facilitate refinement of image capture parameters and post capture image processing.

Description of the Related Art

Imaging devices that are structured light active sensing systems include a transmitter and a receiver configured to transmit and receive patterns corresponding to spatial codes (or "codewords") to generate a depth map that indicates the distance of one or more objects in a scene from the imaging device. The farther away an object in a scene is from the transmitter and the receiver, the closer a received codeword reflected from the object is from its original position (compared to the transmitted codeword) because a propagation path of the outgoing codeword and the reflected incoming codeword are more parallel. Conversely, the closer the object is to the transmitter and receiver, the farther the received codeword is from its original position in the transmitted codeword. Accordingly, the difference between the position of a received codeword and the corresponding transmitted codeword may be used to determine the depth of an object in a scene. Structured light active sensing systems may use these determined depths to generate a depth map of a scene, which may be a three dimensional representation of the scene. Many applications may benefit from determining a depth map of a scene, including image quality enhancement and computer vision techniques.

In some aspects, generating a depth map may include detecting codewords. In some aspects, the codewords may include an array of symbols. Decoding filters may identify spatial boundaries for codewords and symbols, and classify symbols as, for example, "0" or "1" based on their intensity values. Decoding filters may use matched filters, corresponding to the set of harmonic basis functions used to define the set of possible codewords, to classify incoming basis functions. Therefore, depth map accuracy depends on accurately receiving symbols, codewords, and/or basis functions.

If the light source used to project a pattern (for example, a laser) is too low, then spots corresponding to brighter symbols may be too dark to be differentiated from darker symbols. Accordingly, there is a need for methods and systems to improve depth map generation for digital imaging applications.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description," one will understand how the features of this invention provide advantages that include improved depth map generation.

One embodiment disclosed is an imaging device. The imaging device includes a plurality of transmitters including a first transmitter configured to generate a structured light pattern with a first depth of field at a first resolution and a second structured light pattern with a second depth of field at the first resolution, wherein the second depth of field is wider than the first depth of field, a receiver configured to focus within the first depth of field to receive the first structured light pattern and capture a first image representing the first structured light pattern and to focus within the second depth of field to receive the second structured light pattern and capture a second image representing the second structured light pattern; and an electronic hardware processor configured to generate a depth map of the scene based on the first image and the second image.

In some aspects, the electronic hardware processor is further configured to adjust image capture parameters of a third image based on the generated depth map, and to capture the third image using the image capture parameters. In some aspects, the electronic hardware processor is configured to adjust one or more of an aperture, shutter speed, or illumination parameter of the third image based on the depth map. In some aspects, the electronic hardware processor is further configured to store one or more of the depth map and the third image to a stable storage. In some aspects, the first transmitter is configured to generate the first structured light pattern to have a first maximum resolution at a first distance from the imaging device and the second transmitter is configured to generate the second structured light pattern to have a second maximum resolution lower than the first structured light pattern at a second distance from the imaging device. In some aspects, the first distance and the second distance are equivalent. In some aspects, the first distance is different than the second distance. In some aspects, the first transmitter is configured to generate the first depth of field to overlap with the second depth of field. In some aspects, the first transmitter is configured to generate the first depth of field to be contained within the second depth of field.

Another aspect disclosed is a method of capturing an image with an imaging device. The method includes generating, using a first light emitter, a first structured light pattern with a first depth of field at a first resolution onto a scene, focusing, via an electronic hardware processor an imaging sensor within the first depth of field to capture a first image representing the scene illuminated by the first structured light pattern, generating, using a second light emitter, a second structured light pattern with a second depth of field at the first resolution, wherein the second depth of field is wider than the first depth of field, focusing the imaging sensor within the second depth of field to capture a second image representing the scene illuminated by the second structured light pattern, generating, using the electronic hardware processor, a depth map of the scene based on the first image and the second image, determining image capture parameters based on the depth map, capturing, using the imaging sensor, a third image of the scene based on the image capture parameters; and storing the third image to a stable storage. In some aspects, the method includes adjusting one or more of an aperture, shutter speed, or illumination parameter of the third image based on the depth map. In some aspects, the method includes storing the depth map to the stable storage. In some aspects, the method includes generating the first structured light pattern to have a first maximum resolution at a first distance from the imaging device and the second transmitter is configured to generate the second structured light pattern to have a second maximum resolution lower than the first structured light pattern at a second distance from the imaging device. In some aspects, the first distance and the second distance are equivalent. In some aspects, the first distance is different than the second distance. In some aspects, the method includes generating the first depth of field to overlap with the second depth of field. In some aspects, the method includes generating the first depth of field to be contained within the second depth of field.

Another aspect disclosed is a non-transitory computer readable storage medium comprising instructions that when executed cause a processor to perform a method of capturing an image with an imaging device. The method includes generating, using a first light emitter, a first structured light pattern with a first depth of field at a first resolution onto a scene, focusing, via an electronic hardware processor an imaging sensor within the first depth of field to capture a first image representing the scene illuminated by the first structured light pattern, generating, using a second light emitter, a second structured light pattern with a second depth of field at the first resolution, wherein the second depth of field is wider than the first depth of field, focusing the imaging sensor within the second depth of field to capture a second image representing the scene illuminated by the second structured light pattern, generating, using the electronic hardware processor, a depth map of the scene based on the first image and the second image, determining image capture parameters based on the depth map, capturing, using the imaging sensor, a third image of the scene based on the image capture parameters; and storing the third image to a stable storage.

In some aspects, the method of the non-transitory computer readable storage medium includes generating the first structured light pattern to have a first maximum resolution at a first distance from the imaging device and the second transmitter is configured to generate the second structured light pattern to have a second maximum resolution lower than the first structured light pattern at a second distance from the imaging device. In some aspects, the first distance and the second distance are equivalent.

BRIEF DESCRIPTION OF THE DRAWINGS

The various features illustrated in the drawings may not be drawn to scale. Accordingly, the dimensions of the various features may be arbitrarily expanded or reduced for clarity. Furthermore, dotted or dashed lines and objects may indicate optional features or be used to show organization of components. In addition, some of the drawings may not depict all of the components of a given system, method, or device. Finally, like reference numerals may be used to denote like features throughout the specification and figures.

DETAILED DESCRIPTION

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect disclosed herein may be embodied by one or more elements of a claim.

Furthermore, although particular aspects are described herein, many variations and permutations of these aspects fall within the scope of the disclosure. In addition, the scope of the disclosure is not intended to be limited to particular the benefits, uses, or objectives disclosed herein. Rather, aspects of the disclosure are intended to be broadly applicable to different wired and wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Figure 1:
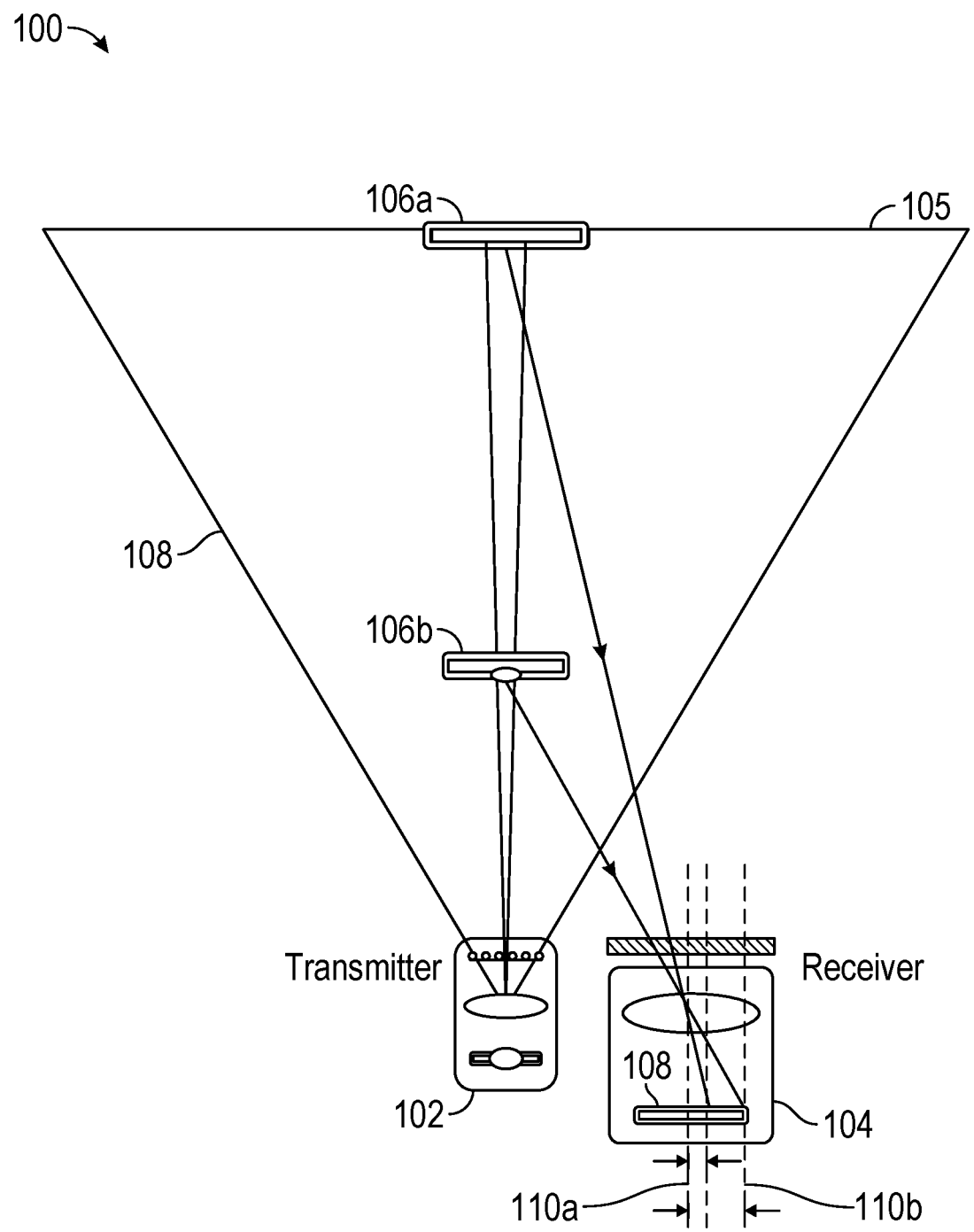
FIG. 1 shows a structured light transmitter and receiver.

FIG. 1 shows a structured light transmitter 102 and receiver 104. Active sensing may project unique patterns (or codes) from the transmitter 102 onto a scene and receiving reflections of those patterns at the receiver 104. The size of the patterns or code projected by the transmitter 102 influences the smallest detectable object. Additionally, both the transmitter 102 and receiver 104 are "band-tuned" at a certain depth plan and become band-limited as the depth in the scene moves away from that plane.

In some aspects, the transmitter may be configured to transmit a structured light pattern 105 that is focused at a particular depth, for example, either of the depths represented by 106a-b. The transmitter may produce a structured light pattern that has a field of view 108 at the various depths 106a-b.

The receiver may be tuned to receive the structured light pattern 105 at one or more of the various depths 106a-b. Depending on the depth received by the receiver 104, the information encoded in the structured light pattern 105 may be received by an imaging sensor 108 in the receiver at a variety of positions on the imaging sensor 108, as shown by positions 110a and 110b.

Figure 2A:
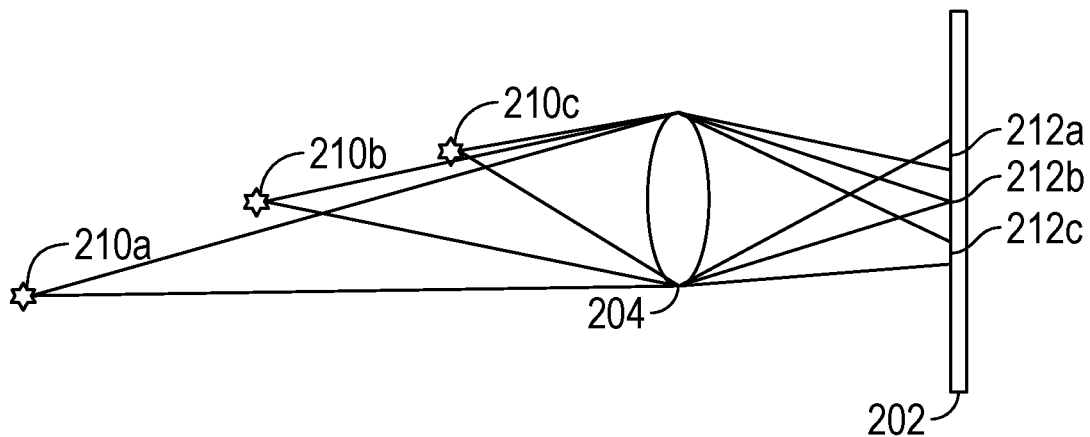
FIG. 2A shows a receiver including a lens and an imaging sensor.

FIG. 2A shows a receiver including a lens and an imaging sensor. FIG. 2A demonstrates that the imaging sensor 202 may receive light information via the lens 204 which is reflected from a plurality of objects at different depths, shown as objects 210a-c. Depending on the depth of the objects 210a-c, the quality of the reflected light at the imaging sensor may vary. For example, light reflected from object 210b is shown well focused on the surface of the imaging sensor 202 as point 212a. In contrast, light reflected from object 210a, shown as 212a, may be focused on somewhat ahead of the imaging sensor 202, and light reflected from object 210c, shown as 212c, may be focused behind the imaging sensor 202. This may result in a reduced bandwidth of light being available for sensing the objects 210a and 210c as compared to object 210b.

Figure 2B:
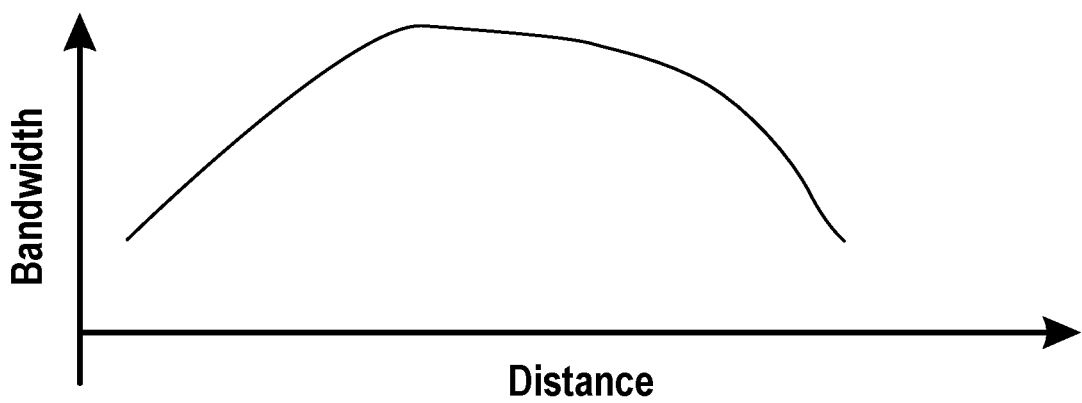
FIG. 2B shows a graph demonstrating how the bandwidth of light reflected by an object and received by the receiver is affected by the distance of the objects.

FIG. 2B shows a graph 250 demonstrating how the bandwidth of light reflected by an object and received by the receiver is affected by the distance of the objects. This may result in a receiver, such as a camera of an imaging device, having difficulty detecting small objects that are positioned away from a focal plane of the camera.

Figure 3A:
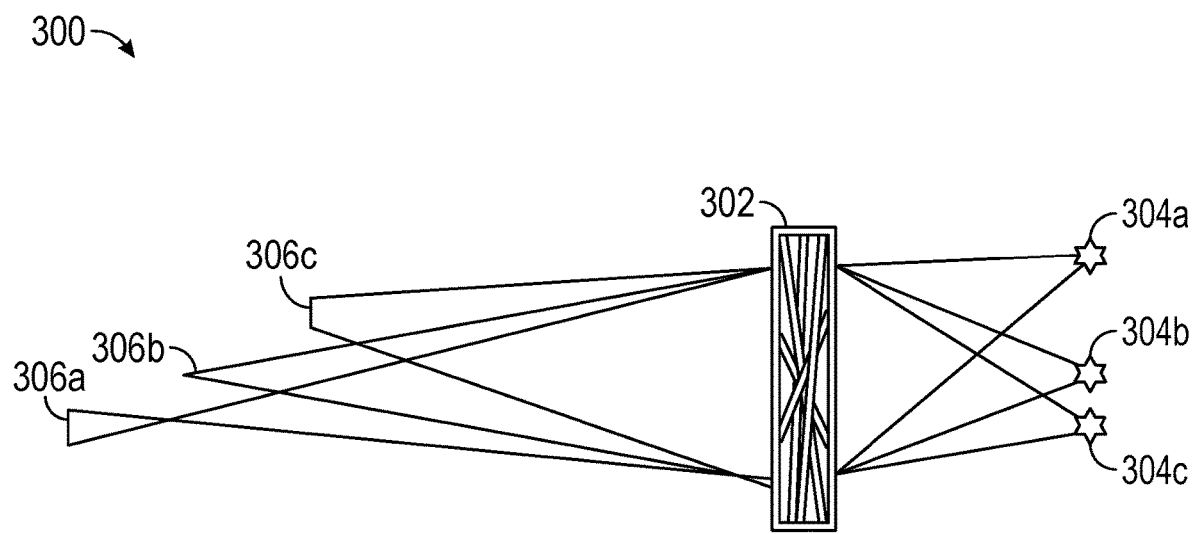
FIG. 3A shows a transmitter that utilizes a diffractive optical element.

FIG. 3A shows a transmitter that utilizes a diffractive optical element. FIG. 3A shows that light may be emitted from multiple locations 304a-c of a transmitting surface. As the light passes through a diffractive optical element 302, it may be focused on a focal plane, shown by point 306b. However, the transmitter may be unable to provide the same focused light at different depths within a scene, shown by depths 306a and 306c.

Figure 3B:
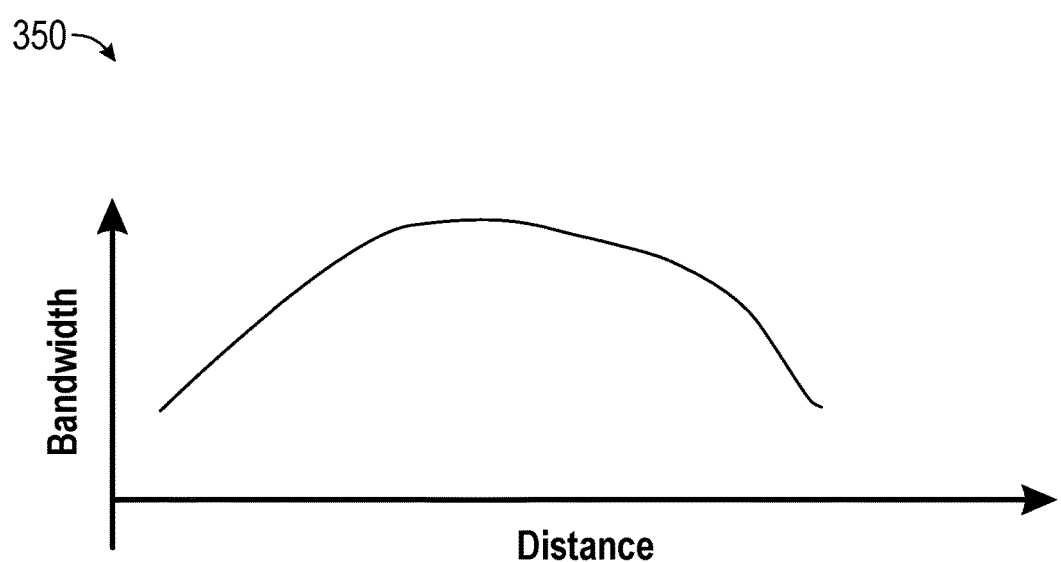
FIG. 3B is a graph demonstrating how the transmitter bandwidth may vary with distance due to the effects described above with respect to FIG. 3A

FIG. 3B is a graph 350 demonstrating how the transmitter bandwidth may vary with distance due to the effects described above with respect to FIG. 3A.

Figure 4A:
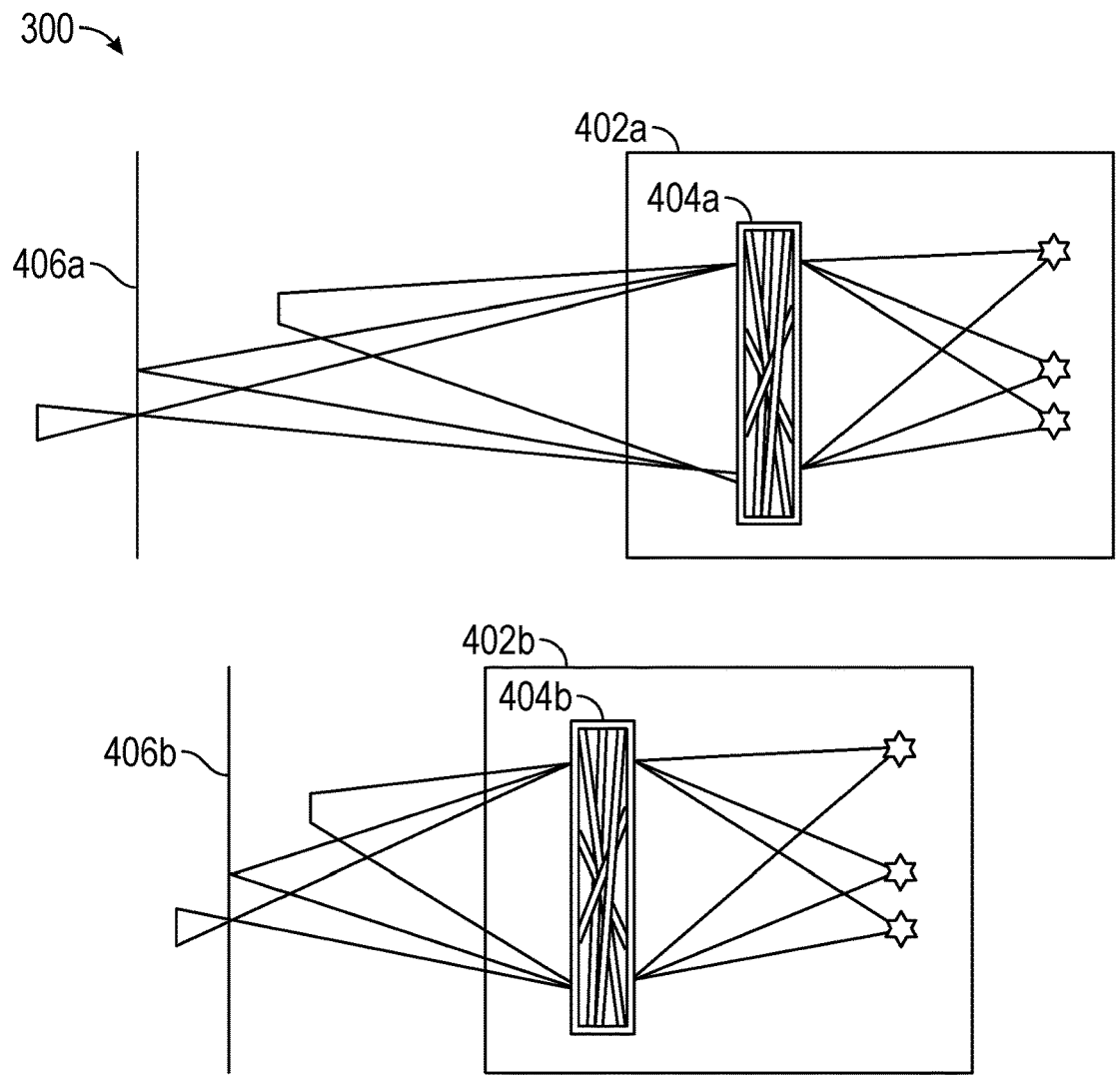
FIG. 4A shows how two light emitters may be combined into a single device to provide a broader range of coverage for structured light patterns.

FIG. 4A shows how two light emitters may be combined into a single device to provide a broader range of coverage for structured light patterns. FIG. 4A shows light emitter 402a and 402b, which may be included in a single imaging device. The two light emitters 402a-b include a diffractive optical element 404a-b respectively. The two light emitters 402a-b are tuned for different focal distances, shown as 406a-b respectively. The results of such a configuration are shown in FIG. 4B, discussed below.

Figure 4B:
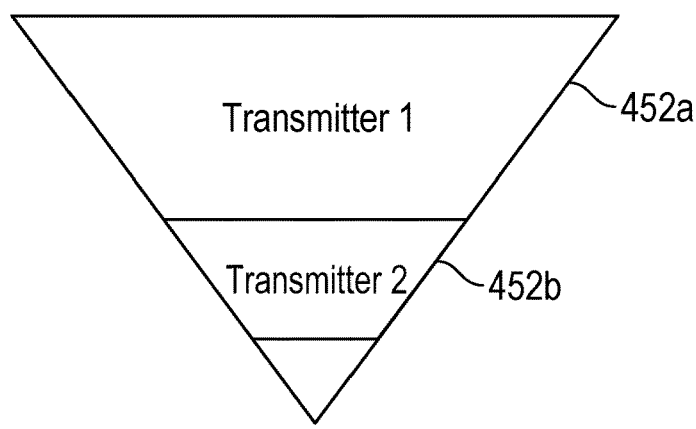
FIG. 4B shows a reception range of an imaging device equipped with the two light emitters of FIG. 4A.

FIG. 4B shows a reception range of an imaging device equipped with the two light emitters 402a-b of FIG. 4A. As shown, the reception range 450 includes a first depth sensing zone 452a, provided by the light emitter 402a, and a second depth sensing zone 452b, provided by the light emitter 402b.

Figure 5A:
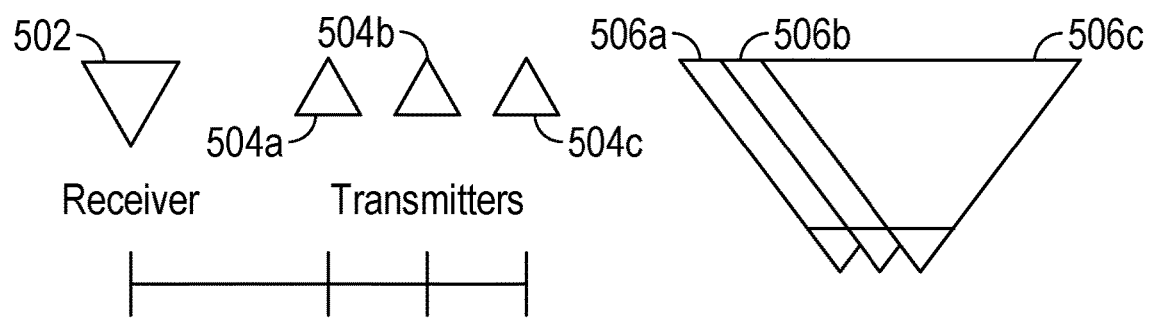
FIG. 5A shows an exemplary configuration of a receiver and three transmitters or light emitters.

FIG. 5A shows an exemplary configuration of a receiver and three transmitters or light emitters. In the exemplary configuration of FIG. 5A, the three transmitters 504a-c are all located on the same horizontal side of the receiver 502, but each transmitter 504a-c is at a different distance from the receiver 502. As such, the transmitters 504a-c generate a combined structured light pattern shown by 506a-c. Reflections from objects in a scene from each structured light pattern 506a-c may have different levels of occlusion based on the different positions of the three transmitters 405a-c. The overlapping coverage provided by the three structured light patterns 506a-c may provide for improved depth sensing when compared to devices utilizing other transmitter configurations.

Figure 5B:
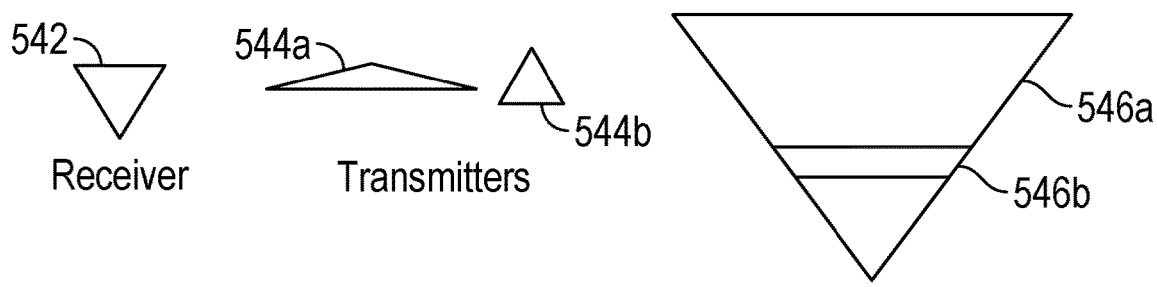
FIG. 5B shows another exemplary configuration of a receiver and two transmitters or light emitters.

FIG. 5B shows another exemplary configuration of a receiver and two transmitters or light emitters. In the exemplary configuration of FIG. 5B, the two transmitters are designed to provide structured light patterns are different focal depths. As shown by the structured light patterns 546a-b, the transmitter 544a is designed to provide a longer focal depth resulting in a broader field of view for the structured light pattern 546a. In contrast, the transmitter 544b is designed to provide a shorter focal depth, resulting in higher resolution and a smaller field of view for the structured light pattern 546b. The complementary coverage provided by the two structured light patterns 546a-b may provide for improved depth sensing when compared to devices utilizing other transmitter configurations.

Figure 5C:
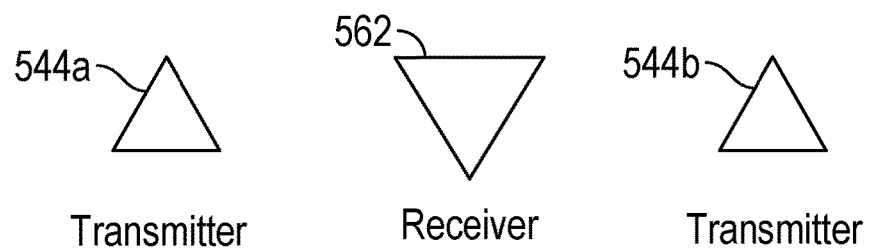
FIG. 5C shows another exemplary configuration of a receiver and two transmitters.

FIG. 5C shows another exemplary configuration of a receiver and two transmitters. In the configuration 560, transmitters 544a-b are positioned on either side of the receiver 562. Thus, structured light patterns emitted by the two transmitters 544a-b may provide a depth map that is generated from depth information that suffered minimal degradation from occlusion. For example, to the extent a particular side of an object is occluded from transmitter 544a, transmitter 544b may be in a position to illuminate that side of the object, and provide depth information to the receiver 562.

Figure 6:
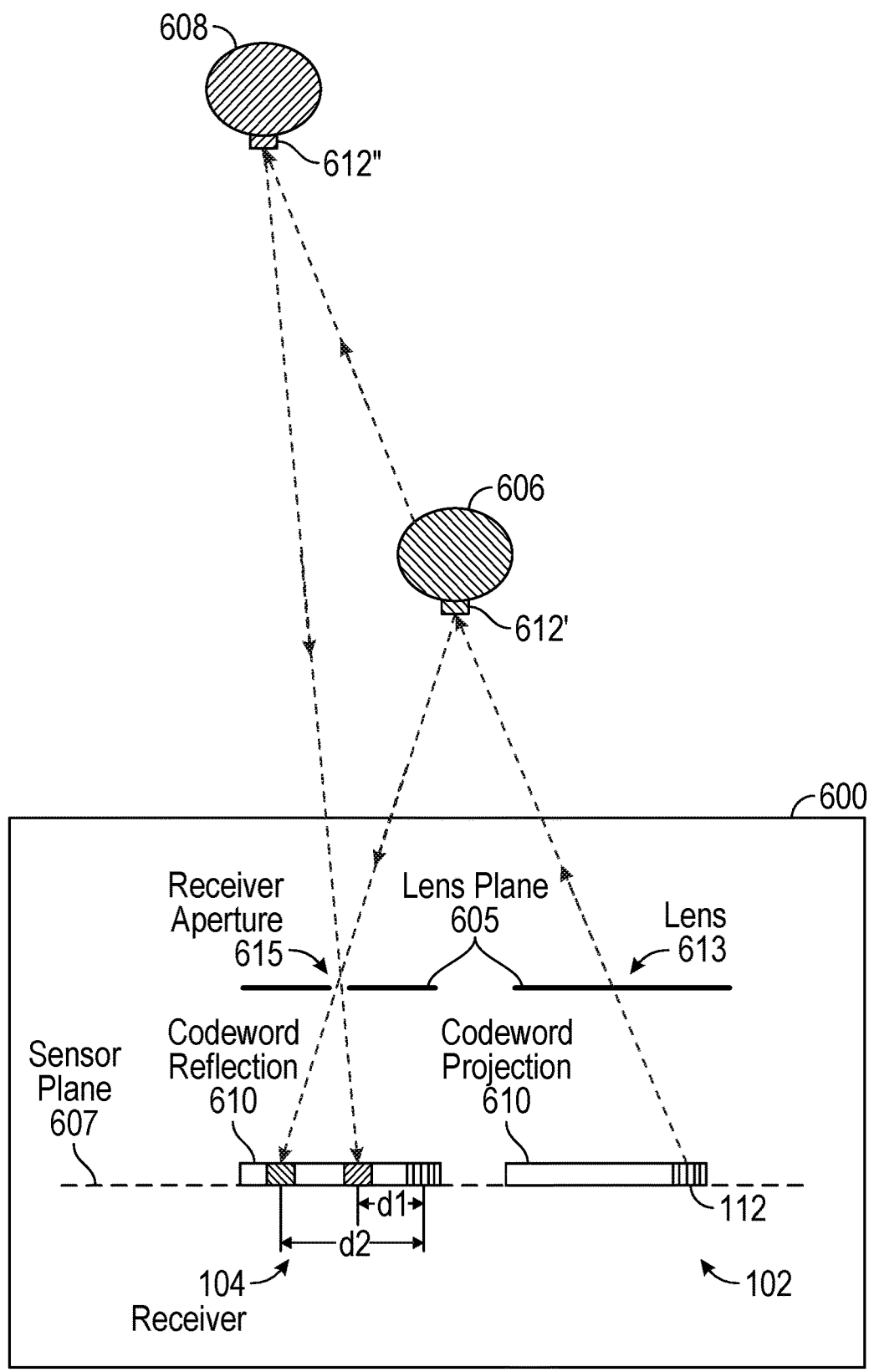
FIG. 6 illustrates an example of how depth may be sensed for one or more objects in a scene.

FIG. 6 illustrates an example of how depth may be sensed for one or more objects in a scene. The description with respect to FIG. 6 may be used by any of the disclosed embodiments to determine one or more depths of an image scene utilizing structured light. FIG. 6 shows a device 600 including a transmitter 102 and a receiver 104. The device is illuminating two objects 606 and 608 with structured light emitted from transmitter 102 as codeword projection 610. The codeword projection 610 reflects from objects 606 and/or 608 and is received as a reflected codeword 611 by receiver 104 on sensor plane 607.

In the illustrated aspect, the transmitter 102 is on the same reference plane (e.g., lens plane 605) as the receiver 104. The transmitter 102 projects the codeword projection 610 onto the objects 606 and 608 through an aperture 613.

The codeword projection 610 illuminates the object 606 as projected segment 612', and illuminates the object 608 as projected segment 612". When the projected segments 612' and 612" are received by the receiver 104 through receiver aperture 615, the reflected codeword 111 may show reflections generated from the object 608 at a first distance d1 and reflections generated from the object 106 at a second distance d2.

As shown by FIG. 6, since the object 606 is located closer to the transmitter 102 (e.g., a first distance from the transmitter device) the projected segment 612' appears at a distance d2 from its initial location. In contrast, since the object 608 is located further away (e.g., a second distance from the transmitter 102), the projected segment 612" appears at a distance d1 from its initial location (where d1<d2). That is, the further away an object is from the transmitter/receiver, the closer the received projected segment/portion/window is from its original position at the receiver 104 (e.g., the outgoing projection and incoming projection are more parallel). Conversely, the closer an object is from the transmitter/receiver, the further received projected segment/portion/window is from its original position at the receiver 104. Thus, the difference between received and transmitted codeword position may be used as an indicator of the depth of an object. In one example, such depth (e.g., relative depth) may provide a depth value for objects depicted by each pixel or grouped pixels (e.g., regions of two or more pixels) in an image.

Various types of modulation and coding schemes may be used to generate a codeword projection or code mask. These modulation and coding schemes include temporal coding, spatial coding, and direct codification.

In temporal coding, patterns are successively projected onto the measuring surface (e.g., over time). This technique has high accuracy and resolution but is less suitable for dynamic scenes.

In spatial coding, information is encoded in a local neighborhood based on shapes and patterns. Pseudorandom codes may be based on De-Bruijn or M-arrays define the codebook (e.g., m-ary intensity or color modulation). Pattern segmentation may not be easily attained, for example, where the shapes and patterns are distorted.

In direct codification, both horizontal and vertical pixel coordinates are encoded. Modulation may be by a monotonic phase or an intensity waveform. However, this scheme may utilize a codebook that is larger than the codebook utilized for other methods. In most methods, received codewords may be correlated against a defined set of possible codewords (e.g., in a codebook). Thus, use of a small set of codewords (e.g., small codebook) may provide better performance than a larger codebook. Also, since a larger codebook results in smaller distances between codewords, additional errors may be experienced by implementations using larger codebooks.

Exemplary Codes for Active Depth Sensing

Structured light patterns may be projected onto a scene by shining light through a codemask. Light projected through the codemask may contain one or more tessellated codemask primitives. Each codemask primitive may contain an array of spatial codes. A codebook or data structure may include the set of codes. Spatial codes, the codemask, and codemask primitives may be generated using basis functions. The periodicities of the basis functions may be chosen to meet the requirements for the aggregate pattern of Hermitian symmetry (for eliminating ghost images and simplifying manufacturing), minimum duty cycle (to ensure a minimum power per codeword), perfect window property (for optimum contour resolution and code packing for high resolution), and randomized shifting (for improved detection on object boundaries). A receiver may make use of the codebook and/or the attributes of the design intended to conform to the constraints when demodulating, decoding, and correcting errors in received patterns.

The size and corresponding resolution of the spatial codes corresponds to a physical spatial extent of a spatial code on a codemask. Size may correspond to the number of rows and columns in a matrix that represents each codeword. The smaller a codeword, the smaller an object that can be detected. For example, to detect and determine a depth difference between a button on a shirt and the shirt fabric, the codeword should be no larger than the size of the button. In an embodiment, each spatial code may occupy four rows and four columns. In an embodiment, the codes may occupy more or fewer rows and columns (rows×columns), to occupy, for example, 3×3, 4×4, 4×5, 5×5, 6×4, or 10×10 rows and columns The spatial representation of spatial codes corresponds to how each codeword element is patterned on the codemask and then projected onto a scene. For example, each codeword element may be represented using one or more dots, one or more line segments, one or more grids, some other shape, or some combination thereof.

The "duty cycle" of spatial codes corresponds to a ratio of a number of asserted bits or portions (e.g., "1s") to a number of un-asserted bits or portions (e.g., "0s") in the codeword. When a coded light pattern including the codeword is projected onto a scene, each bit or portion that has a value of "1" may have energy (e.g., "light energy"), but each bit having a value of "0" may be devoid of energy. For a codeword to be easily detectable, the codeword should have sufficient energy. Low energy codewords may be more difficult to detect and may be more susceptible to noise. For example, a 4×4 codeword has a duty cycle of 50% or more if 8 or more of the bits in the codeword are "1." There may be minimum (or maximum) duty cycle constraints for individual codewords, or duty cycle constraints, for example, an average duty cycle for the set of codes in the codebook.

The "contour resolution" or "perfect window" characteristic of codes indicates that when a codeword is shifted by an amount, for example, a one-bit rotation, the resulting data represents another codeword. An amount that the codeword is shifted may be referred to as a shift amount. Codes with high contour resolution may enable the structured light depth sensing system to recognize relatively small object boundaries and provide recognition continuity for different objects. A shift amount of 1 in the row dimension and 2 in the column dimension may correspond to a shift by one bit positions to the right along the row dimension, and two bit positions down along the column dimension. High contour resolution sets of codewords make it possible to move a window on a received image one row or one column at a time, and determine the depth at each window position. This enables the determination of depth using a 5×5 window at a starting point centered at the third row and third column of a received image, and moving the 5×5 window to each row, column location from the third row to the third to last row, and the third column to the third to last column. As the codewords overlap, the window may be sized based on the resolution of the object depths to be determined (for example, a button on a shirt).

The symmetry of codes may indicate that the code mask or codebook primitive has Hermitian symmetry, which may provide several benefits as compared to using non-Hermitian symmetric codebook primitives or patterns. Patterns with Hermitian symmetries are "flipped" or symmetric, along both X and Y (row and column) axes.

The aliasing characteristic of codemasks or codemask primitives corresponds to a distance between two codewords that are the same. When an optical pattern includes a tessellated codebook primitive, and when each codebook in the primitive is unique, the aliasing distance may be based on the size of the codebook primitive. The aliasing distance may thus represent a uniqueness criterion indicating that each codeword of the codebook primitive is to be different from each other codeword of the codebook primitive, and that the codebook primitive is unique as a whole. The aliasing distance may be known to one or more receiver devices, and used to prevent aliasing during codeword demodulation. The cardinality of a codemask corresponds to a number of unique codes in a codebook primitive.

Figure 7:
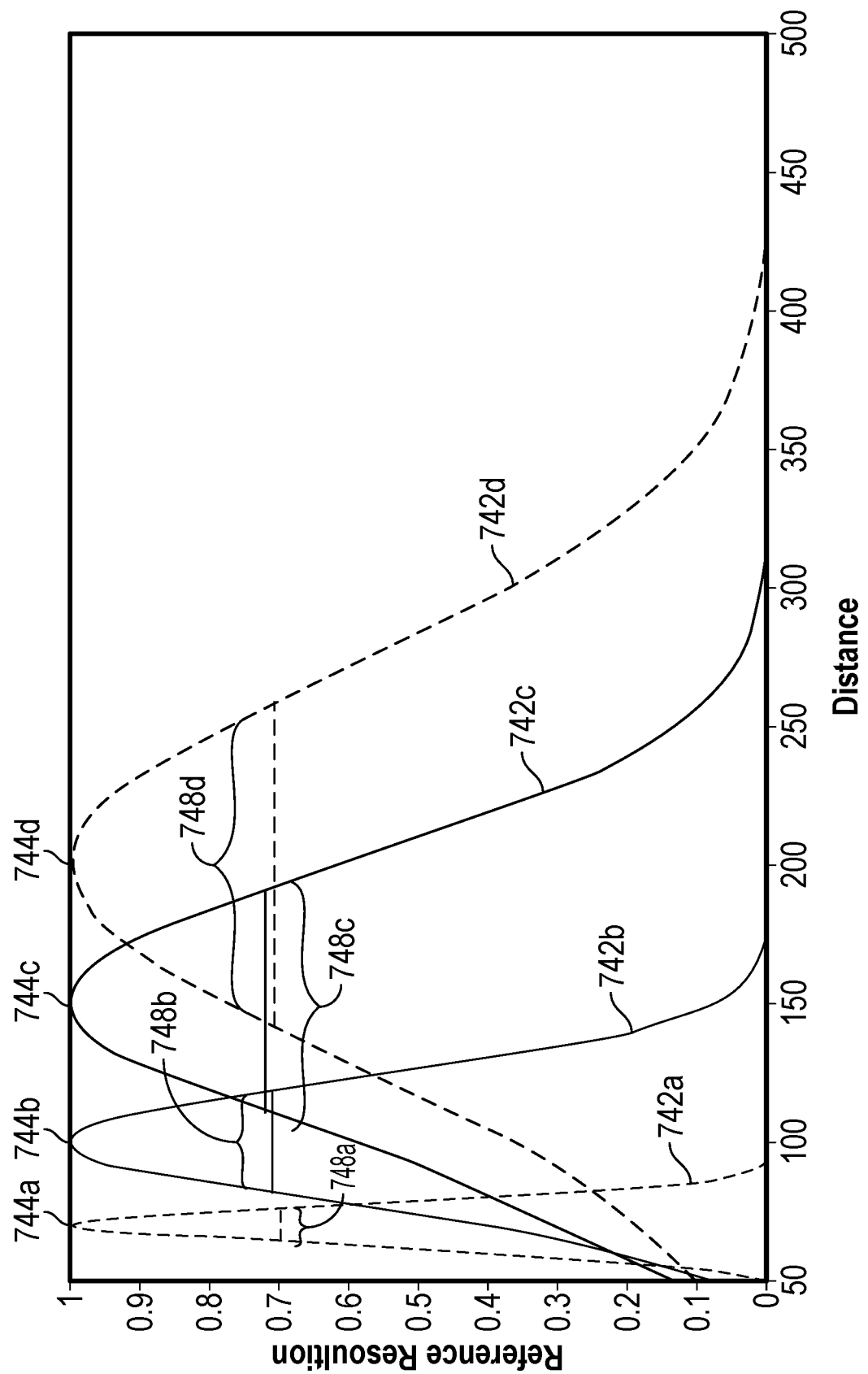
FIG. 7 is a graph showing imaging performance for alterative designs of a diffractive optical element.

FIG. 7 is a graph showing imaging performance for alterative designs of a diffractive optical element. Graph 740 shows four graphs 742a-d representing optical performance of four hypothetical designs of a diffractive optical element. A first design provides the best resolution 744a at a distance of approximately 70 cm. A second design provides the best resolution 744b at a distance of approximately 100 cm. A third design provides the best resolution 744c at a distance of approximately 150 cm. A fourth design provides the best resolution 744d at a distance of approximately 200 cm.

The optical performance of each of the designs shown in FIG. 1B can also be compared at a reference resolution 746 of, for example, 0.7. The reference resolution may be explained as follows; in some aspects, when a best focus is achieved by a particular design, a point in space of a scene being imaged will produce a circle on the lens of the design. This circle is based at least partially on the diffraction limit. The reference (maximum) resolution is 1/circle_diameter; as the point deviates from the optimal focus, the circle becomes larger due to defocusing thus decreasing the resolution. At arbitrary selected reduction, say 0.7, we say the image is no longer in focus.

The first design's optical performance, represented by graph 742a provides a depth of field of a first depth 748a at the reference resolution. The second design's optical performance, represented by graph 742b, provides a depth of field at the reference resolution of a second depth 748b, which is greater than the first depth of field 748a. Note that the second design's depth of field 748b is also at a different distance from the imaging device than the first design's depth of field 748a. The third design's optical performance, represented by graph 742c, provides a depth of field at the reference resolution of a third depth 748c, which is greater than both the first and second depths of field 748a-b. The third depth of field 748c is also provided at a different distance from the imaging device. Note also that the third depth of field 748c overlaps somewhat with the second depth of field 748b. The fourth design's optical performance, represented by graph 742d, provides a depth of field at the reference resolution of a fourth depth 748d, which is greater than any of the first, second, or third depths of field 748a-c. The four depth of field is also provided at a different distance from the imaging device than the first, second or third depths of field 748a-c, although the fourth depth of field 748d overlaps with the third depth of field 748c.

Figure 8:
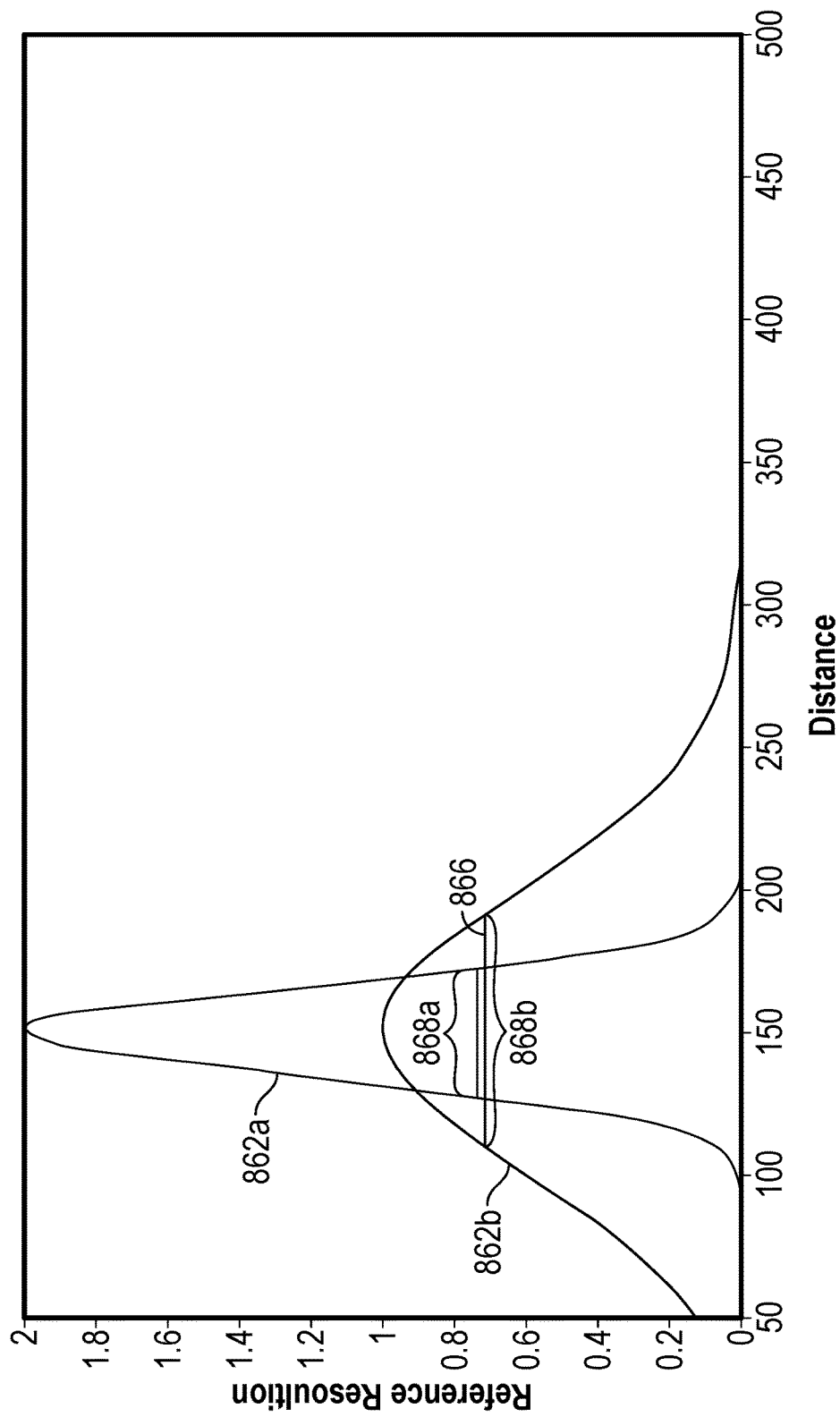
FIG. 8 is a graph showing imaging performance for alternative designs of a diffractive optical element.

FIG. 8 is a graph showing imaging performance for alternative designs of a diffractive optical element. Whereas the designs shown in FIG. 7 achieved equivalent resolutions at different distances from the imaging device, the two designs shown in FIG. 8 both achieve their best resolution at the same distance (150 cm) from the imaging device. However, a first design, shown by graph 862a, achieves a substantially higher resolution than a second design, shown by graph 862b.

However, the second design, with optical performance shown by graph 862b, provides a greater depth of field 868b at a reference resolution 866 than the first design's optical performance 862a with a depth of field 868a.

Figure 9:
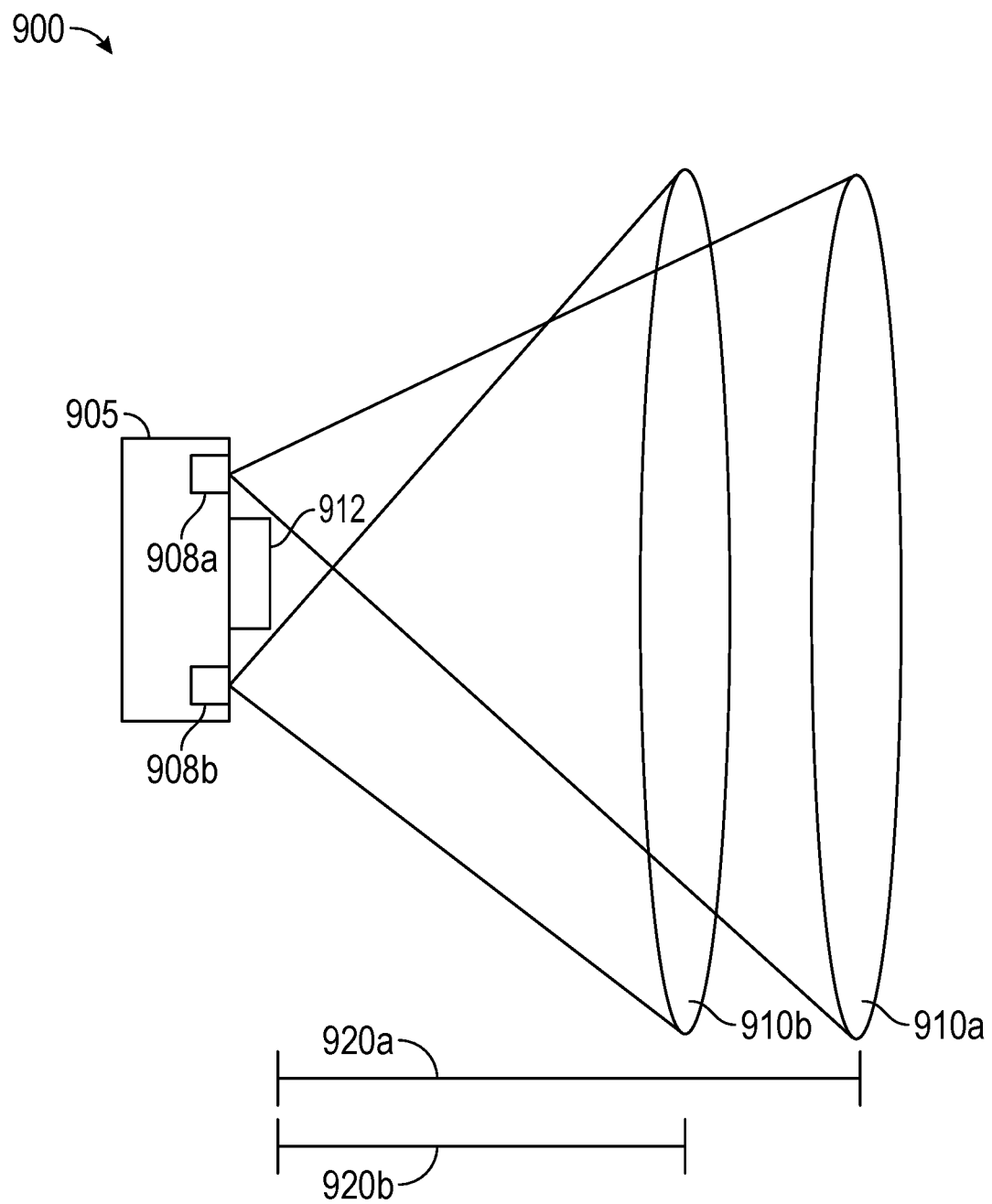
FIG. 9 is an illustration of an imaging device including a plurality of structured light transmitters.

FIG. 9 is an illustration of an imaging device including a plurality of structured light transmitters. FIG. 9 shows the imaging device 905 and two structured light transmitters 908a-b. Each of the structured light transmitters 908a-b transmit a structured light pattern 910a-b respectively. Each of the structured light patterns 910a-b is focused at different distances 920a-b respectively.

A receiver 912 may receive the pattern information from each of the structured light patterns 910a-b. In some aspects, the receiver 912 may include a lens with a variable focal distance. In some aspects, the imaging device 905 may be configured to emit the first structured light pattern 210a when the receiver 912 is adjusted to the focal distance 920a. The receiver may then be configured to capture a first image based on the illumination of the scene by the first structured light pattern 910a. The imaging device 205 may be configured to then generate the second structured light pattern 910b after the receiver 912 has been adjusted to the different focal distance 920b. The receiver may then be configured to capture a second image while the scene is illuminated by the second structured light image.

The imaging device 905 may be configured to generate depth information from the first image and the second image. Because each of the first structured light image 910a and the second structured light image 910b are focused at different distances 920a-b from the imaging device, the generated depth information may be more complete and/or accurate than if the depth information had been generated from only one structured light pattern, such as either of structured light patterns 910a-b.

Figure 10:
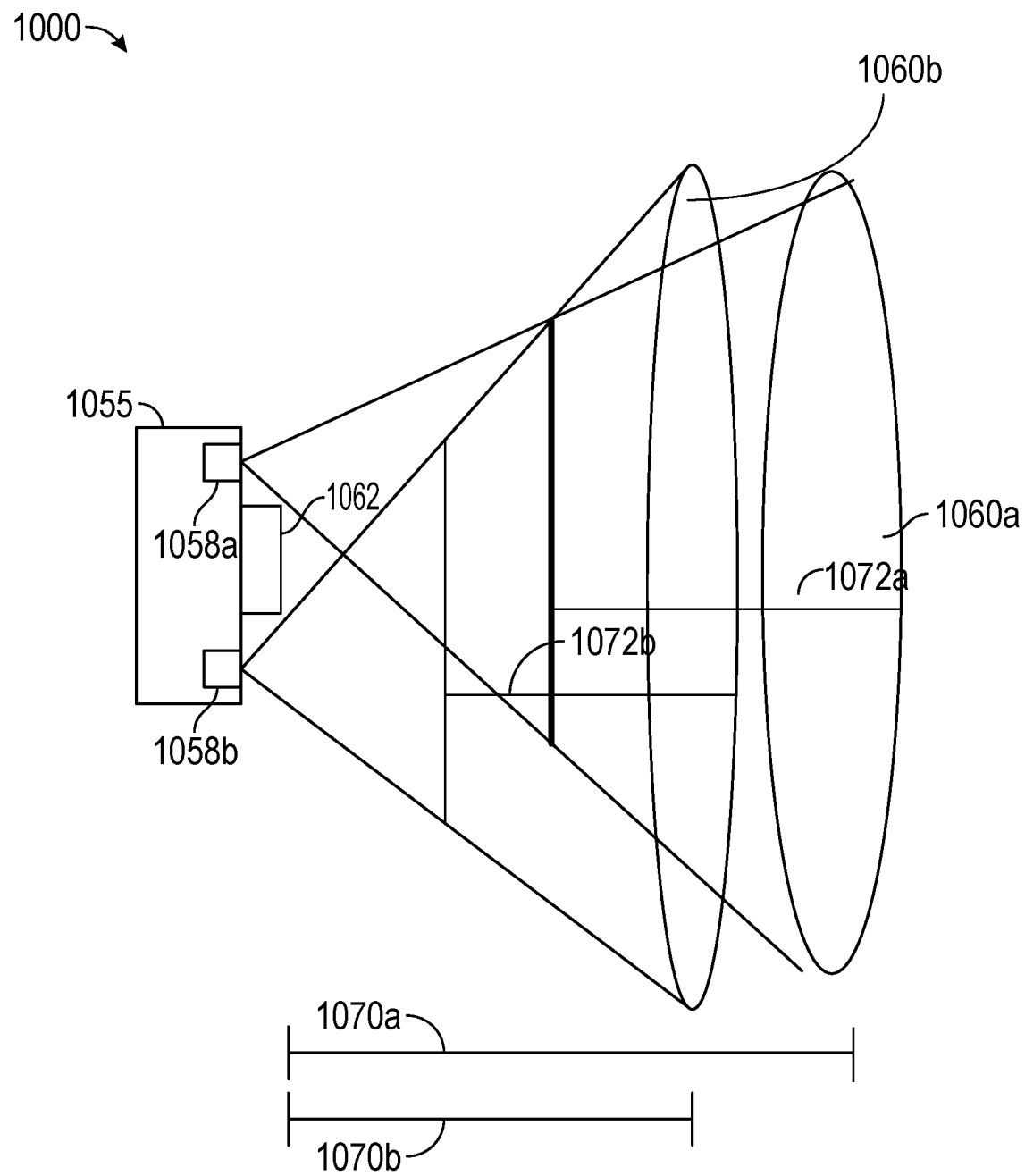
FIG. 10 is a second illustration of an imaging device including a plurality of emitters.

FIG. 10 is a second illustration of an imaging device including a plurality of emitters. The imaging device 1055 of FIG. 10 includes light emitters 1058a-b. Light emitter 1058a is configured to generate a structured light pattern 1060a at a median distance from the imaging device 1055 of 1070a. The first structured light pattern 1060a is generated by the emitter 1058a to have a depth of field indicated as 1072a. The second emitter 1058b is configured to generate structured light pattern 1060b. The structured light pattern 1060b has a depth of field of 272b. Structured light pattern 1060b's depth of field 272b is substantially within the depth of field 272a of the first structured light pattern 1060a generated by light emitter 1058a.

In some aspects, the structured light pattern 1060a may be generated at a first resolution, and the second structured light pattern 1072b may be generated at a second resolution which is higher than the first resolution.

A receiver 1062 may receive the information from each of the structured light patterns 1060a-b. In some aspects, the receiver 1062 may include a lens with a variable focal distance. In some aspects, the imaging device 1055 may be configured to emit the first structured light pattern 1058a when the receiver 1062 is adjusted to the focal distance 270a. The receiver may then be configured to capture a first image based on the illumination of the scene by the first structured light pattern 1060a. The imaging device 1055 may be configured to then generate the second structured light pattern 1060b after the receiver 1062 has been adjusted to the different focal distance 1070b. The receiver may then be configured to capture a second image while the scene is illuminated by the second structured light image.

Figure 11:
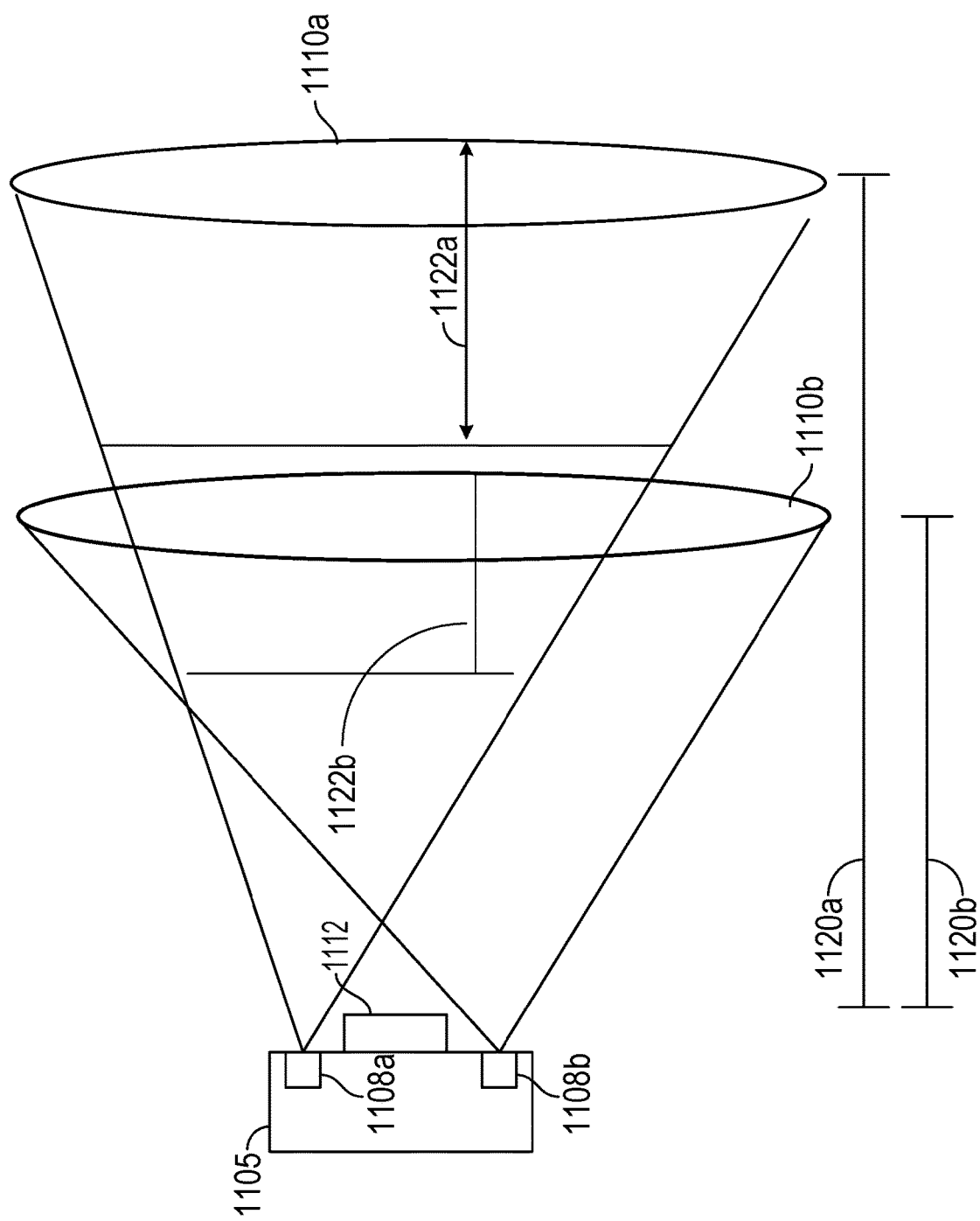
FIG. 11 is a third illustration of an imaging device including a plurality of emitters.

FIG. 11 is a third illustration of an imaging device including a plurality of emitters. The imaging device 1105 of FIG. 11 includes light emitters 1108a-b. Light emitter 1108a is configured to generate a structured light pattern 1110 at a median distance from the imaging device 1105 of 1120a. The first structured light pattern 1110a is generated by the emitter 1108a to have a depth of field indicated as 1122a. The second emitter 308b is configured to generate structured light pattern 1110b. The structured light pattern 1110b has a depth of field of 1122b. Structured light pattern 1110b's depth of field 1122b is narrower than the depth of field 1122a of the first structured light pattern 310a generated by light emitter 1108a. Furthermore, unlike the depth of fields 1022*a-b* of FIG. 10, the depth of field of the two structured light patterns 1110*a-b* in FIG. 11 do not substantially overlap.

In some aspects, the structured light pattern 1110*a* may be generated at a first resolution, and the second structured light pattern 1122*b* may be generated at a second resolution which is higher than the first resolution.

A receiver 1112 may receive the pattern information from each of the structured light patterns 1110*a-b*. In some aspects, the receiver 1112 may include a lens with a variable focal distance. In some aspects, the imaging device 1105 may be configured to emit the first structured light pattern 1108*a* when the receiver 1112 is adjusted to the focal distance 1120*a*. The receiver may then be configured to capture a first image based on the illumination of the scene by the first structured light pattern 1110*a*. The imaging device 305 may be configured to then generate the second structured light pattern 1110*b* after the receiver 1112 has been adjusted to the different focal distance 1120*b*. The receiver may then be configured to capture a second image while the scene is illuminated by the second structured light image.

In some aspects, the device 1105 may include three or more emitters. For example, in some aspects, a first emitter may generate a structured light pattern with a depth of field of 50 centimeters to 4 meters from the imaging device 1105. A second light emitter may be configured to generate a second structured light pattern with a depth of field of 30 cm to 50 cm from the imaging device 1105. A third light emitter may be configured to generate a third structured light pattern with a depth of field of 20 cm to 30 cm from the imaging device 1105.

Figure 12:
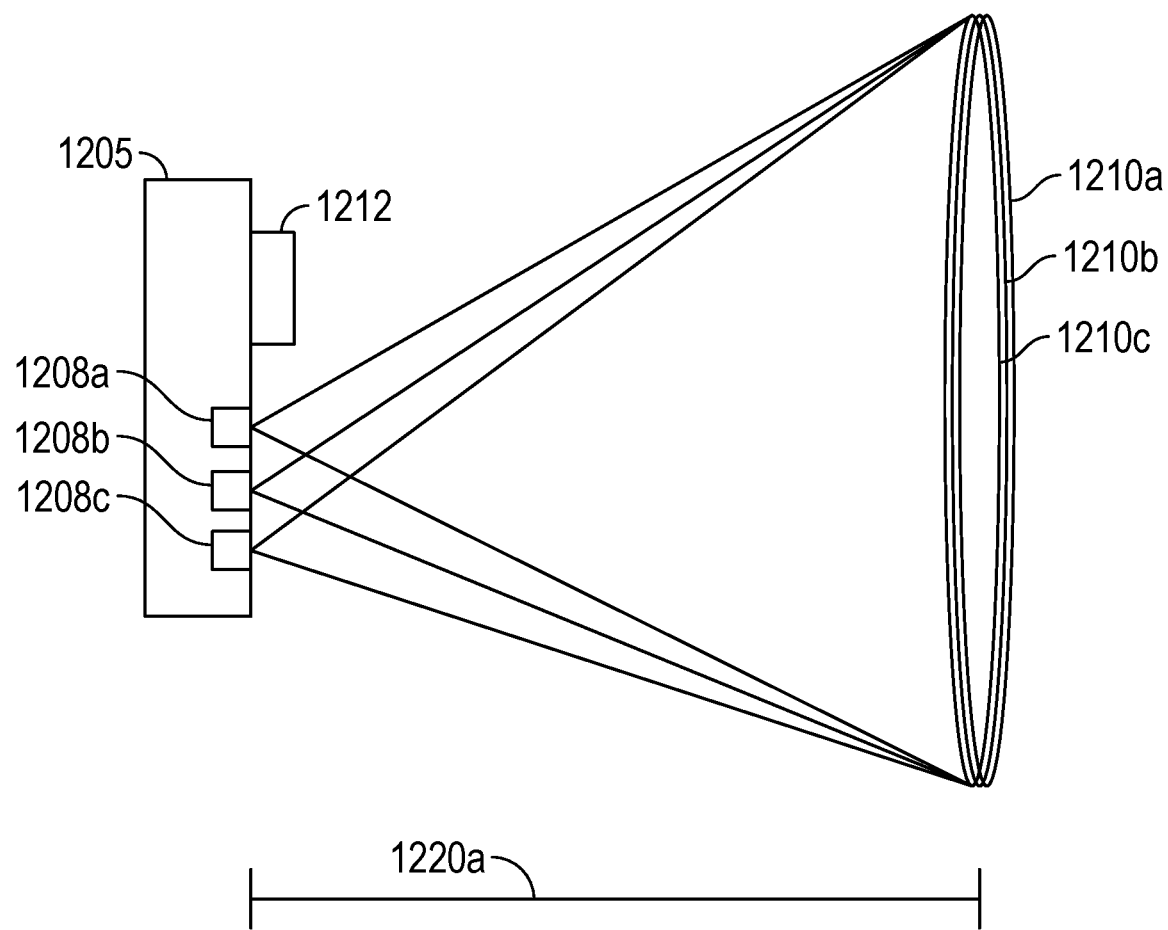
FIG. 12 is a fourth illustration of an imaging device including a plurality of emitters.

FIG. 12 is a fourth illustration of an imaging device including a plurality of emitters. The imaging device 1205 of FIG. 12 includes light emitters 1208*a-c*. Unlike the emitters 908*a-b*, 1008*a-b*, and 1108*a-b* shown in FIGS. 9-11 respectively, light emitters 1208*a-c* are positioned on the same side of but different distances from a receiver 1214.

Light emitter 1208*a* is configured to generate a structured light pattern 1210*a* at a median focal distance from the imaging device 1205 of 1220*a*. The second emitter 308*b* is configured to generate structured light pattern 1210*b* at the median focal distance 1220*a*. Light emitter 1208*c* is configured to generate structured light pattern 1210*c* at the median focal distance 1220*a*. In some aspects, by generating the structured light patterns 1210*a-c* from emitters 1208*a-c* that are at different distances from the receiver 1214, objects in the scene 1201 may have different levels of occlusion to each of the structured light patterns 1210*a-c*. As such, the imaging device 1205 may be able to derive improved depth information for the scene 1201 when compared to an imaging device using, for example, fewer light emitters to illuminate the scene 1201.

A receiver 1212 may receive the pattern information from each of the structured light patterns 1210*a-c*. In some aspects, the imaging device 305 may be configured to emit the first structured light pattern 1208*a*. The receiver 1212 may then be configured to capture a first image based on the illumination of the scene by the first structured light pattern 1210*a*. The imaging device 1205 may be configured to then generate the second structured light pattern 1210*b*. The receiver 1212 may then be configured to capture a second image while the scene is illuminated by the second structured light pattern 1210*b*. The imaging device 1205 may be configured to then generate the third structured light pattern 1210*c*. The receiver 1212 may then be configured to capture a third image while the scene is illuminated by the third structured light pattern 1210*c*.

The imaging device 1205 may be configured to combine information from the first, second, and third images to generate a depth map. The depth map may include more complete depth information and/or more accurate depth information for the scene 1201.

Figure 13:
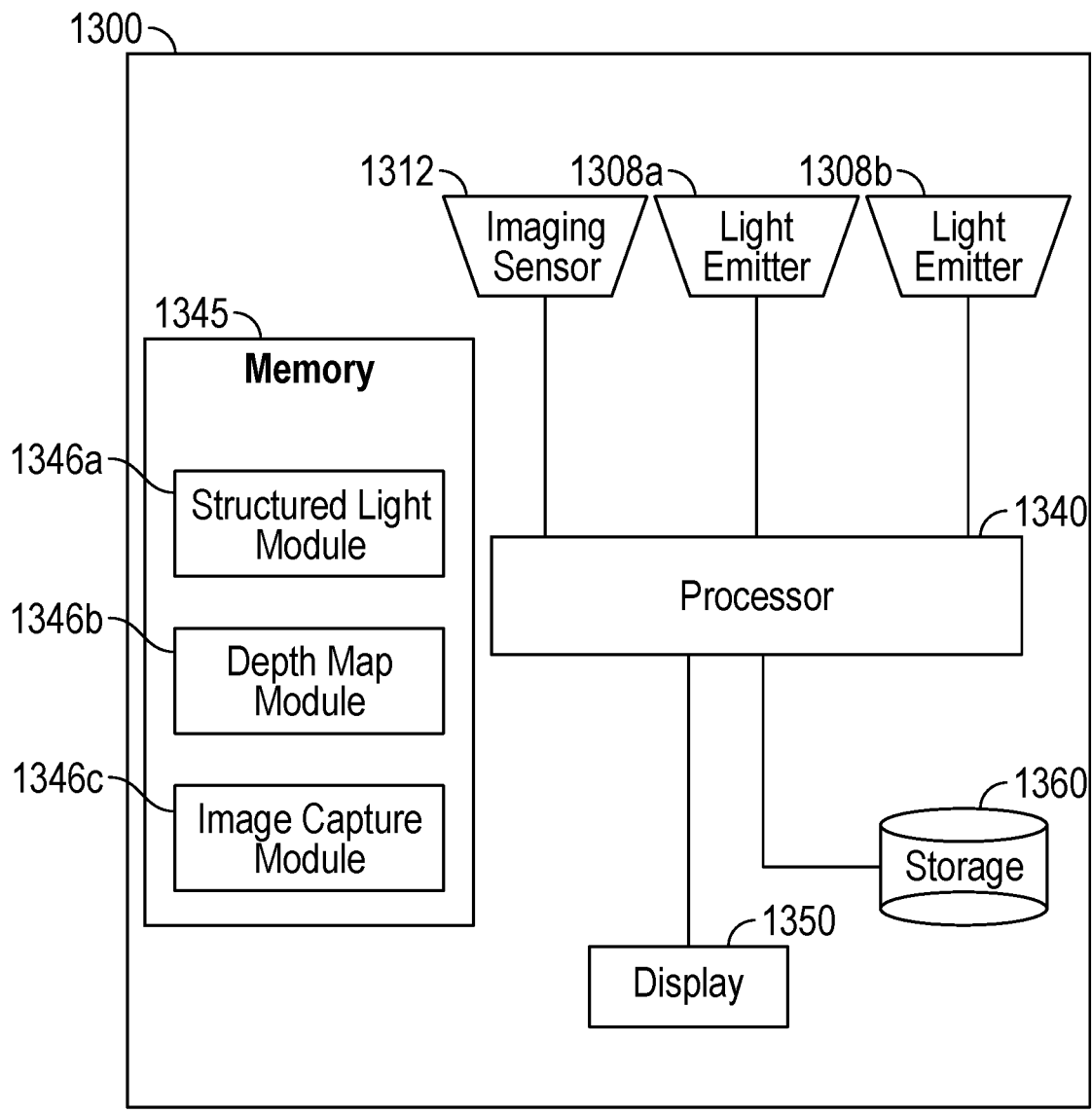
FIG. 13 is a block diagram of an exemplary device implementing the disclosed embodiments.

FIG. 13 is a block diagram of an exemplary device implementing the disclosed embodiments. The device 1300 may be an embodiment of any of the devices 1005, 1055, 1105, or 1205, shown above with respect to FIGS. 10-12. The device 1300 includes at least two light emitters 1308*a-b* and an imaging sensor 1312. The two light emitters 1308*a-b* may represent any of the light emitters 208*a-b*, 1058*a-b*, 308*a-b*, 408-*a-b* discussed above with respect to FIGS. 10-12. The imaging sensor 1312 may represent any of the imaging sensors 912, 1062, 1112, 1312, or 1212, discussed above.

The device 1300 also includes an electronic hardware processor 1340, an electronic hardware memory 1345 operably coupled to the processor 1340, an electronic display 1350 operably coupled to the processor 1340, and a storage 1360 operably coupled to the processor 1340. The memory 1345 stores instructions that configure the processor to perform one or more functions discussed herein. In some aspects, the instructions may be organized into modules to facilitate discussion of their functionality. For example, the instructions of the device 1300 of FIG. 13 are organized into a structured light module 1346*a*, depth map module 1346*b*, and an image capture module 1346*c*.

Figure 14:
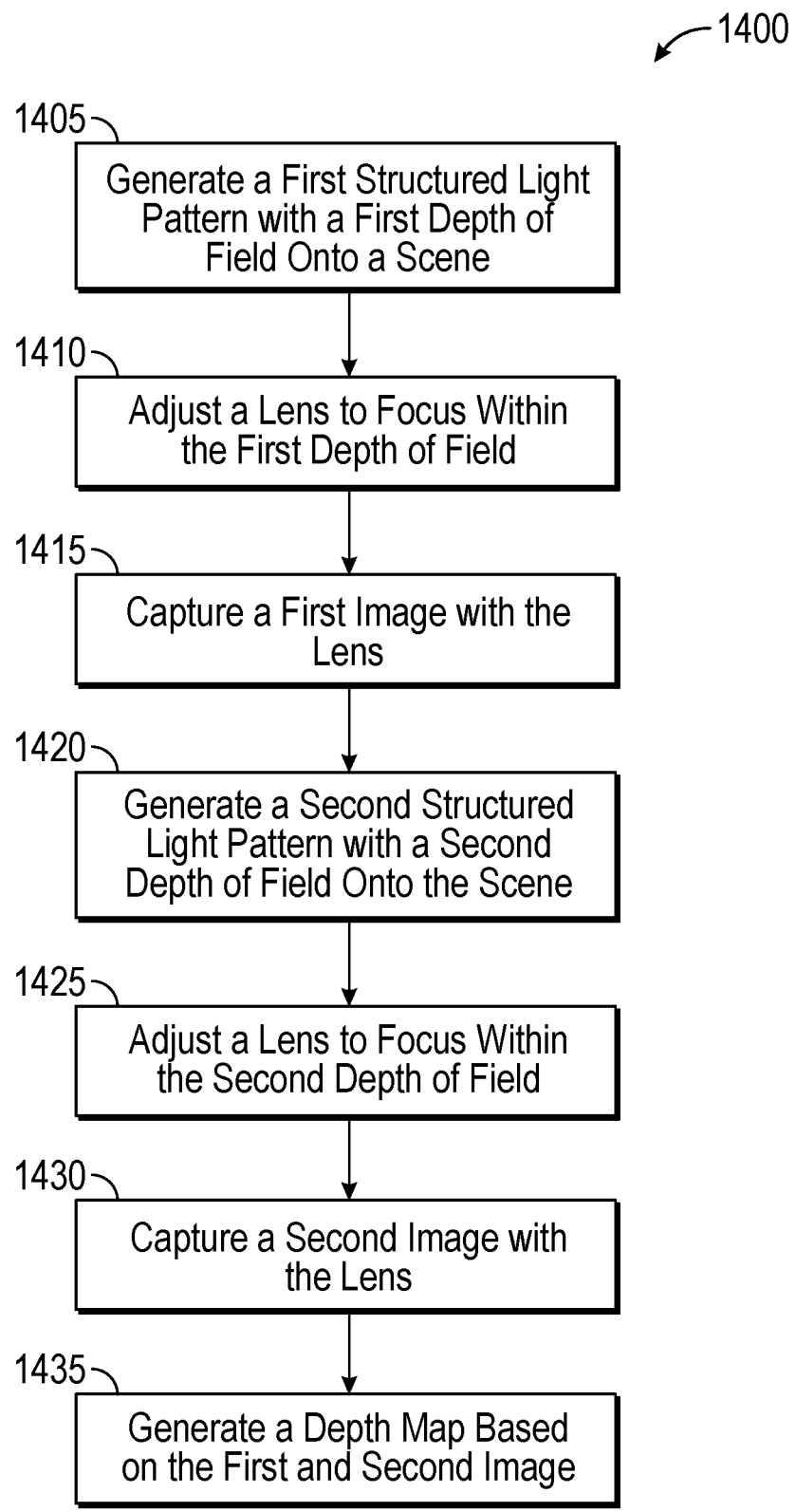
FIG. 14 is a flowchart of an exemplary method of generating a depth map.

FIG. 14 is a flowchart of an exemplary method of generating a depth map. In some aspects, the process 1400 may be performed by the device 1300 discussed above with respect to FIG. 13. Alternatively, the process 1400 may be performed by any of the imaging devices and/or using any of the imaging configurations shown in FIG. 1, 4A-C, 5A-C, or 9-12.

Process 1400 may provide enhanced depth sensing. As discussed above, existing designs for active sensing may rely on projecting and detecting unique patterns or codes. The size of the pattern may determine the smallest detectable object. Both a structured light transmitter and receiver may be band-tuned" to certain depth planes and may be band limited the further away from the depth plane an object in a scene being imaged falls. Under these circumstances, a light emitting device may be challenged to project structured light codes the further away from the focal plane an object lies.

Some aspects of process 1400 may utilize an auto focus camera as a structured light receiver and shift a focus range based on the scene being imaged. Multiple structured light transmitters, focused at different depths may be utilized. A subset of the transmitters may then be selected depending on the scene characteristics and possibly other considerations.

In block 1405, a first structured light pattern is generated onto a scene. In some aspects, the first structured light pattern may be generated by, for example, one of the light emitters 1308*a-b*. In some aspects, the first structured light pattern may be generated by a laser projected through a diffractive optical element as described above. In these aspects, the diffractive optical element used to generate the first structured light pattern is configured to provide the first structured light pattern with a first depth of field. In some aspects, the light emitter generating the first structured light pattern is a first distance from a receiver or imaging sensor that is configured to capture the first structured light pattern.

In block 1410, a lens is adjusted so as to be focused within the first depth of field. For example, in some aspects, the lens may be part of an imaging sensor, such as imaging sensor 1312 discussed above with respect to device 1300.

In block 1415, a first image is captured with the lens while it is focused within the first depth of field. Thus, the first image represents the first structured light pattern as projected onto the scene. In some aspects, the first image is captured using the imaging sensor 1312 discussed above with respect to exemplary device 1300.

In block 1420, a second structured light pattern is generated onto the scene. In some aspects, the second structured light pattern may be generated using a different light emitter than was used to generate the first structured light pattern. In some aspects, the second structured light pattern may be generated by one of the light emitters 1308-b. The second structured light pattern may be generated by illuminating a laser light source and projecting the light source through a second diffractive optical element (DOE) as discussed above. In these aspects, the second DOE may be configured to generate the second structured light pattern so as to have a second depth of field different than the first depth of field of the first structured light pattern. In some aspects, the depths of field may be different in that they are present at different distances from the imaging sensor or receive capturing the structured light patterns. In some aspects, the depths of field may be different in that they are of different widths. In other words, one depth of field may be, for example, 20 cm deep, while the second depth of field may be 50 cm deep. As discussed above, in some aspects, the two depths of field may overlap completely or partially, or may not overlap depending on the embodiment's configuration.

In some aspects, the second light emitter may be a different second distance from the imaging sensor 1312 or a receiver configured to capture the first and second structured light patterns. In some aspects, the second light emitter may be on an equivalent horizontal side of the imaging sensor capturing the first and second structured light pattern, or may be on an opposing horizontal side of the imaging sensor. In some aspects, the first DOE may be configured to generate the first structured light pattern using a first maximum resolution, while the second DOE is configured to generate the second structured light pattern to have a second maximum resolution different from (greater or less than) the first resolution. In some aspects, the first and second structured light patterns may be configured to provide their maximum resolution at different (or equivalent) distances from a receiver or imaging sensor capturing the structured light patterns.

In block 1425, the lens is adjusted so as to be focused within the second depth of field. In block 1430, a second image is captured with the lens while it is focused within the second depth of field. Thus, the second image represents the second structured light pattern as projected onto the scene. In some aspects, the second image may be captured by the imaging sensor 1312.

In block 1435, a depth map is generated based on the first and/or second images. For example, objects included in the scene at a depth within the first depth of field may be represented in the depth map based on the first image, while objects within the scene at a depth within the second depth of field may be represented in the depth map based on data derived from the second image.

In some aspects, only the first or second image may be utilized to generate the depth map. For example, in some aspects, the first or second image may be utilized based on characteristics of the scene being imaged. In some aspects, a quality level of depth information provided in the images may be evaluated, with the image including the highest quality depth information used to generate the depth map. The quality level may be based on an amount of depth information or an amount of corrupted or missing depth information. For example, an image having the least amount of missing depth information may be utilized to generate the depth map in some aspects.

Process 1400 may also include writing the generated depth map to a stable storage (or storage medium). In some aspects, one or more image capture parameters of a third image may be adjusted based on the depth map. For example, in some aspects, an exposure time or flash illumination setting (such as flash intensity and/or whether a flash is used) may be modified based on the depth map. The third image may then be captured using the one or more image capture parameters. The third image may also be written to a stable storage or other I/O device after capture.

Table 1 below shows a variety of configurations of diffractive optical elements that may be combined to provide various advantages when generating a depth map. In various embodiments, process 1400 may utilize any of the exemplary configurations shown below to generate a depth map. Process 1400 may also utilize any of the exemplary configurations shown above in any one of FIGS. 4A-C, 5A-C, and 7-12.

TABLE 1

| | First Structured Light Pattern | | | Second Structured Light Pattern | | |
|---|---|---|---|---|---|---|
| Exemplary Configuration | DOF at ref res | Max Res. | Distance from Imaging Sensor | DOF at ref res | Max Res. | Distance from Imaging Sensor |
| 1 | 50 cm-4M | "A" pts per rad | | | None | |
| 2 | | | D1 | | | D2 (not equal to "D1") |
| 3 | 50 cm-1 m | "A" pts per rad | | 1 meter-4 meters | "A" pts per rad | |
| 4 | 20 cm-50 cm | "A" pts per rad | | 50 cm-1 m | "A" pts per rad | |
| 5 | 50 cm-4 m | A points per radian | | 70 cm-90 cm | 4 A points per radian | |

In table 1, corresponding blank cells for the first and second structured light patterns may be equivalent across a single configuration.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. An imaging device comprising:
a plurality of transmitters including:
a first transmitter configured to transmit a first structured light pattern focused at a first distance and having a first depth of field; and
a second transmitter configured to transmit a second structured light pattern focused at a second distance and having a second depth of field, wherein the second depth of field is wider than the first depth of field, the second distance is different than the first distance, and the second structured light pattern is transmitted after transmitting the first structured light pattern;
a receiver configured to:
focus within the first depth of field at the first distance to capture a first image of a scene, the first image representing the first structured light pattern; and
focus within the second depth of field at the second distance to capture a second image of the scene, the second image representing the second structured light pattern; and
an electronic hardware processor configured to generate a depth map of the scene based on the first image and the second image.

2. The imaging device of claim 1, wherein the electronic hardware processor is further configured to adjust image capture parameters of a third image based on the generated depth map, and to capture the third image using the image capture parameters.

3. The imaging device of claim 2, wherein the electronic hardware processor is configured to adjust one or more of an aperture, shutter speed, or illumination parameter of the third image based on the depth map.

4. The imaging device of claim 2, wherein the electronic hardware processor is further configured to store one or more of the depth map and the third image to a stable storage.

5. The imaging device of claim 1, wherein the first transmitter is configured to generate the first structured light pattern to have a first maximum resolution at the first distance from the imaging device and the second transmitter is configured to generate the second structured light pattern to have a second maximum resolution lower than the first structured light pattern at the second distance from the imaging device.

6. The imaging device of claim 1, wherein the first depth of field overlaps with the second depth of field.

7. The imaging device of claim 6, wherein the first depth of field is contained within the second depth of field.

8. A method of capturing an image with an imaging device, comprising:
generating, using a first light emitter, a first structured light pattern, focused at a first distance and having a first depth of field, onto a scene;
focusing, via an electronic hardware processor, an imaging sensor within the first depth of field at the first distance to capture a first image representing the scene illuminated by the first structured light pattern;
generating, using a second light emitter, a second structured light pattern focused at a second distance and having a second depth of field, wherein the second depth of field is wider than the first depth of field, the second distance is different than the first distance, and the second structured light pattern is generated after generating the first structured light pattern;
focusing the imaging sensor within the second depth of field at the second distance to capture a second image representing the scene illuminated by the second structured light pattern; and
generating, using the electronic hardware processor, a depth map of the scene based on the first image and the second image.

9. The method of claim 8, further comprising:
determining image capture parameters based on the depth map;
adjusting one or more of an aperture, shutter speed, or illumination parameter to capture a third image based on the depth map;
capturing, using the imaging sensor, the third image of the scene based on the image capture parameters; and
storing the third image to a stable storage.

10. The method of claim 8, further comprising storing the depth map to a stable storage.

11. The method of claim 8, further comprising generating the first structured light pattern to have a first maximum resolution at the first distance from the imaging device and the second light emitter is configured to generate the second structured light pattern to have a second maximum resolution lower than the first structured light pattern at the second distance from the imaging device.

12. The method of claim 8, further comprising generating the first depth of field to overlap with the second depth of field.

13. The method of claim 12, further comprising generating the first depth of field to be contained within the second depth of field.

14. A non-transitory computer readable storage medium comprising instructions that when executed cause a processor to perform a method of capturing an image with an imaging device, the method comprising:
generating, using a first light emitter, a first structured light pattern, focused at a first distance and having a first depth of field, onto a scene;
focusing, via an electronic hardware processor an imaging sensor within the first depth of field at the first distance to capture a first image representing the scene illuminated by the first structured light pattern;
generating, using a second light emitter, a second structured light pattern focused at a second distance and having a second depth of field, wherein the second depth of field is wider than the first depth of field the second distance is different than the first distance, and the second structured light pattern is generated after generating the first structured light pattern;
focusing the imaging sensor within the second depth of field at the second distance to capture a second image representing the scene illuminated by the second structured light pattern; and
generating, using the electronic hardware processor, a depth map of the scene based on the first image and the second image.

15. The non-transitory computer readable storage medium of claim 14, the method further comprising generating the first structured light pattern to have a first maximum resolution at the first distance from the imaging device and the second light emitter is configured to generate the second structured light pattern to have a second maximum resolution lower than the first structured light pattern at the second distance from the imaging device.

* * * * *